(12) United States Patent
Burgess et al.

(10) Patent No.: US 7,989,979 B2
(45) Date of Patent: Aug. 2, 2011

(54) PNEUMATICALLY TELESCOPING MAST HAVING DC OPERATED CONTROLS

(75) Inventors: Scott Alan Burgess, Wooster, OH (US); Jerry Albert Christensen, Wooster, OH (US); Michael Allen Bohurjak, Medina, OH (US)

(73) Assignee: The Will-Burt Company, Orville, OH (US)

( * ) Notice: Subject to any disclaimer, the term of this patent is extended or adjusted under 35 U.S.C. 154(b) by 1069 days.

(21) Appl. No.: 10/950,829

(22) Filed: Sep. 27, 2004

(65) Prior Publication Data

US 2005/0241885 A1 Nov. 3, 2005

Related U.S. Application Data

(60) Provisional application No. 60/565,878, filed on Apr. 28, 2004.

(51) Int. Cl.
*F21V 21/22* (2006.01)

(52) U.S. Cl. .................. 307/10.1; 307/9.1; 307/112

(58) Field of Classification Search ............ 307/9.1, 307/10.1, 112
See application file for complete search history.

(56) References Cited

U.S. PATENT DOCUMENTS

| | | | |
|---|---|---|---|
| 4,062,156 A | 12/1977 | Roth | |
| 4,300,186 A * | 11/1981 | Hurd | 362/540 |
| 4,413,451 A * | 11/1983 | Featherstone et al. | 52/28 |
| 4,420,917 A | 12/1983 | Parlanti | |
| 4,488,209 A * | 12/1984 | Gosswiller | 362/486 |
| 4,714,399 A * | 12/1987 | Olson | 414/621 |
| 4,843,402 A | 6/1989 | Clement | |
| 4,871,138 A | 10/1989 | Sauter | |
| 4,913,458 A * | 4/1990 | Hamilton | 280/6.153 |
| 4,999,545 A * | 3/1991 | Summer | 315/219 |
| 5,066,866 A * | 11/1991 | Hallidy | 290/1 R |
| 5,102,375 A | 4/1992 | Featherstone | |
| 5,107,672 A | 4/1992 | Featherstone | |
| 5,139,464 A | 8/1992 | Lehnert | |
| 5,163,650 A | 11/1992 | Adams et al. | |
| 5,168,679 A | 12/1992 | Featherstone | |
| 5,203,746 A | 4/1993 | Lehnert | |
| 5,272,609 A * | 12/1993 | Nelson | 362/249.07 |
| 5,572,837 A | 11/1996 | Featherstone et al. | |
| 5,593,129 A | 1/1997 | Adams et al. | |
| 5,615,855 A | 4/1997 | Marue et al. | |
| 5,687,081 A * | 11/1997 | Wellman et al. | 701/50 |
| 5,691,623 A * | 11/1997 | Tsantilis | 320/155 |
| 5,718,087 A | 2/1998 | Featherstone et al. | |
| 5,721,737 A * | 2/1998 | Radjabi et al. | 370/449 |
| 5,743,635 A | 4/1998 | Hulse et al. | |
| 5,759,148 A * | 6/1998 | Sipin | 600/18 |

(Continued)

OTHER PUBLICATIONS

International Search Report for International Application No. PCT/US05/14155.

*Primary Examiner* — Jared J Fureman
*Assistant Examiner* — Adi Amrany
(74) *Attorney, Agent, or Firm* — Fay Sharpe LLP

(57) ABSTRACT

A control system for a pneumatically operated mast has a first control, a second control, and a positioning member. A first serial link communicates the first control with the second control. A second serial link communicates the second control with the positioning member. A relay system communicates with the first and second control and the positioning member. The relay system accommodates a 12 voltage or 24 voltage source.

25 Claims, 8 Drawing Sheets

U.S. PATENT DOCUMENTS

| | | | |
|---|---|---|---|
| 5,980,070 A * | 11/1999 | Hulse et al. .................... 362/385 |
| 6,137,280 A * | 10/2000 | Ackermann et al. .......... 323/354 |
| 6,212,449 B1 * | 4/2001 | Wellman et al. ................ 701/29 |
| 6,253,502 B1 * | 7/2001 | Layton ............................. 52/118 |
| 6,290,377 B1 | 9/2001 | Hulse |
| 6,299,336 B1 | 10/2001 | Hulse |
| 6,302,567 B1 * | 10/2001 | Gamble, Sr. .................. 362/505 |
| RE37,559 E | 2/2002 | Marue et al. |
| 6,484,456 B1 * | 11/2002 | Featherstone et al. .......... 52/118 |
| 6,517,225 B1 * | 2/2003 | Allen et al. .................... 362/485 |
| 6,546,677 B1 * | 4/2003 | Featherstone ................... 52/118 |
| 6,582,105 B1 | 6/2003 | Christensen |
| 6,700,327 B2 * | 3/2004 | Leleve et al. ..................... 315/80 |
| 6,762,945 B2 * | 7/2004 | Morgen .......................... 363/17 |
| 6,767,115 B2 * | 7/2004 | Blackwelder ................. 362/385 |
| 7,081,812 B2 * | 7/2006 | Hastings, Sr. ................. 340/456 |
| 2004/0094212 A1 | 5/2004 | Benckert et al. |

* cited by examiner

PNEUMATICALLY TELESCOPING MAST HAVING DC OPERATED CONTROLS

CROSS-REFERENCE TO RELATED APPLICATION

This application claims the benefit of U.S. Provisional Application Ser. No. 60/565,878 filed Apr. 28, 2004.

INCORPORATION BY REFERENCE

Commonly assigned U.S. Pat. Nos. 6,290,377; 5,980,070; 5,743,635; 6,299,336; and, 6,584,105 are each incorporated by reference herein so that pneumatically actuated telescoping masts known in the art need not be described in detail hereinafter.

BACKGROUND

A pneumatically actuated telescoping mast is well known in the prior art and is generally of such a nature that it may be mounted readily on the roof of a motor vehicle, such as an emergency vehicle or utility vehicle. In such an arrangement the mast is generally used for positioning electrical devices, particularly lighting fixtures and/or cameras at an elevated point above the vehicle. The effect is to immediately light a large area adjacent to the vehicle. This allows that emergency procedures can be conducted under the light, such as at accident scenes or by utility work crews such as after a storm. Pneumatically actuated telescoping masts are particularly advantageous in such situations since they are light weight, compact in a retracted position and capable of being mounted on the roof of most emergency motor vehicles, including automobiles.

The prior art pneumatically telescoping masts are extended using air, under pressure, and in a fully extended position, are generally vertical. A pneumatically telescoping mast typically includes a compressor or other pneumatic control means which displaces telescoping mast sections between retracted and extended positions. Additionally, a pneumatically telescoping mast may also include a mechanism for pivoting the mast between horizontal and vertical positions.

In many applications the pneumatic control mechanism is powered by an air compressor, connected to a DC power source and the mechanism for pivoting the mast is controlled by a DC motor located adjacent to the platform base from which the mast is raised. However, the air compressor for inflating the mast can be provided with power from an AC power source or a DC power source. Where the telescoping mast is provided with a light source at the end, the light can also be powered by either a DC power source or an AC power source. Either a 110 volt or 220 volt power source has been required in order to provide adequate lighting intensity in which emergency personnel can work effectively.

Certain systems of prior art telescoping masts use 12 volt DC power as the preferred power source. These systems include the pneumatic control mechanism. Generally these systems can run and be directly wired to the vehicle battery. However, in some cases, these same mast systems may be powered with self-contained DC power which is not connected to the vehicle at all. Thus, the pneumatic control mechanism or compressor and the mechanism for pivoting the mast typically runs on lower power than the light (12V or 24V DC as opposed to 110V or 220V AC) and indeed can be run on self-contained DC power.

Prior art hand-held remote control devices typically have toggle switches which are vulnerable to breakage and a large quantity of wires are present within the cable. Prior art remote control positioners have separate controls for 12 volt and 24 volt systems.

Thus, it is considered desirable to overcome the aforementioned difficulties and others while achieving better and more advantageous results.

SUMMARY OF THE INVENTION

In accordance with one aspect of the present invention, a control system for a pneumatically operated mast has a first, remote control, a second control, and a positioning member. A first serial link communicates the first control with the second control. A second serial link communicates the second control with the positioning member. A relay system communicating with the first and second control and the positioning member. The relay system accommodates a 12 voltage or 24 voltage source.

In accordance with another aspect of the present invention, a remote control system used with a pneumatic mast lighting system has a serial communications link for communicating with a base control of the mast lighting system. A connector connects the mast lighting system to a remote control keypad which has a plurality of LED message displays.

In accordance with yet another aspect of the present invention, a positioning system for a pneumatic mast and lighting system has a serial link to communicate the positioning system with a base control of the mast and lighting system. A relay accommodates 12 volt and 24 volt power input.

Still other aspects of the present invention will become apparent to those of ordinary skill in the art upon reading the following detailed description of the preferred embodiment.

BRIEF DESCRIPTION OF THE DRAWINGS

The invention may take physical form in certain parts and arrangement of parts, preferred embodiments of which will be described in detail and illustrated in the accompanying drawings which form a part hereof and wherein.

THE PREFERRED EMBODIMENT

Figure 1:
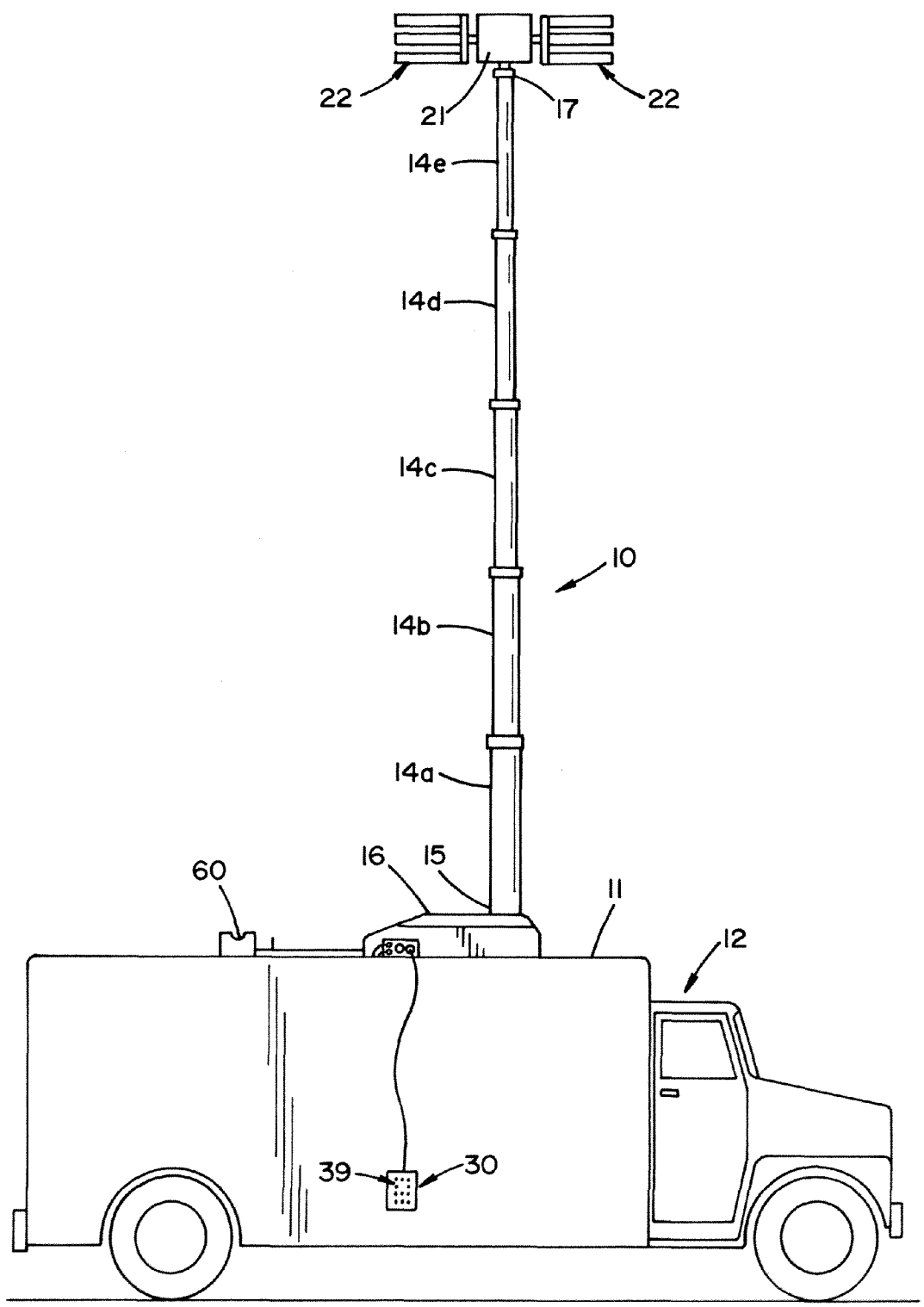
FIG. 1 is a pictorial view illustrating the pneumatically telescoping mast of the present invention.
Figure 2:
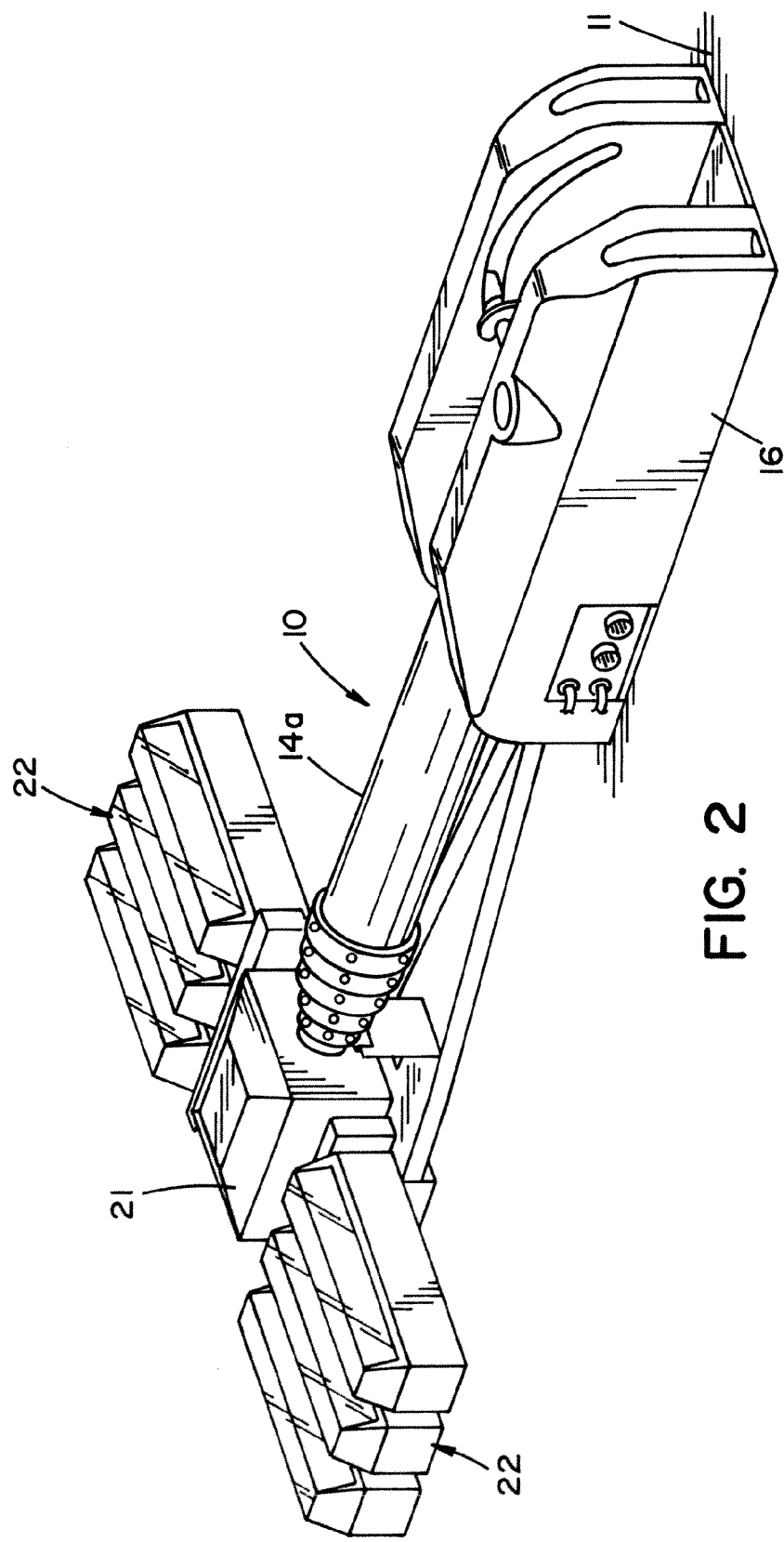
FIG. 2 is a perspective view of the telescoping mast in the stowed position.

Referring to the drawings, wherein the showings are for the purpose of illustrating the preferred embodiment of the invention only and not for the purpose of limiting same, FIG. 1 shows a telescoping mast 10 mounted on the roof 11 of a motor vehicle 12. Referring to FIG. 2, mast 10 is shown in a stowed position which is parallel to roof 11. In FIG. 1, mast 10 is shown in an extended vertical position, perpendicular to roof 11. In accordance with the present invention, the mast is capable of being placed at a tilt angle between 0° and 90° where, for the purpose of this description, 0° is defined as being parallel with vehicle roof 11 and generally horizontal, while 90° is perpendicular to vehicle roof 11 and in a generally vertical position.

As shown in FIG. 1, telescoping mast 10 includes adjacent telescoping sections 14a, 14b, 14c, 14d, and 14e. In the preferred embodiment, telescoping section 14a is at a lower mast end 15 of mast 10 and is pivotally mounted to the base 16 which is mounted to vehicle roof 11. Each of telescoping sections 14a-14e are relatively rigid tubular sections facilitating the pneumatic extension and retraction of telescoping mast 10. Mounted at the upper mast end 17, at telescoping section 14e, is a remote control positioner assembly 21 to facilitate the placement of utility lights 22 and/or cameras at upper mast end 17.

Figure 4:
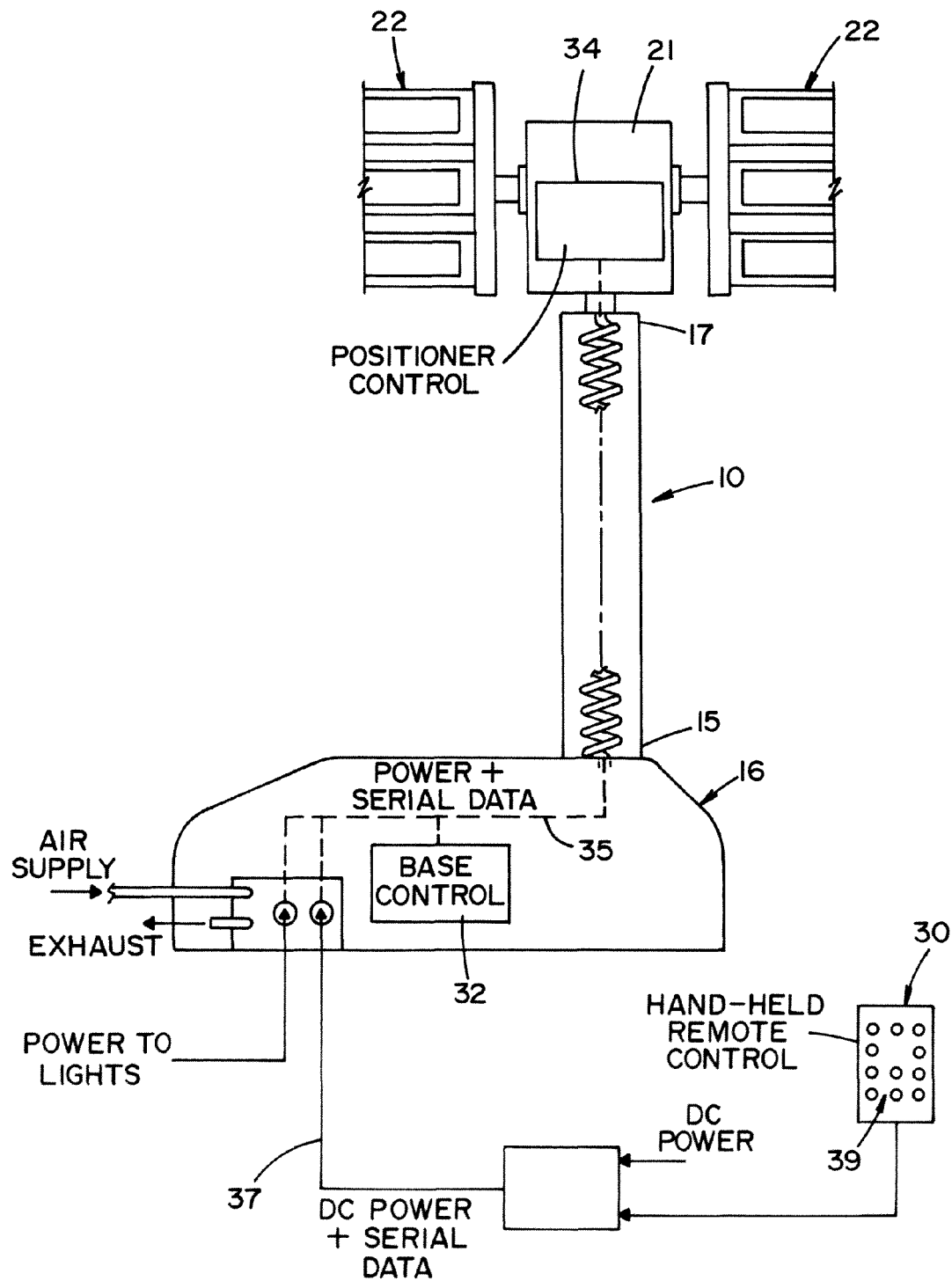
FIG. 4 is an elevation view of a control system of the telescoping mast of the present invention.
Figure 6:
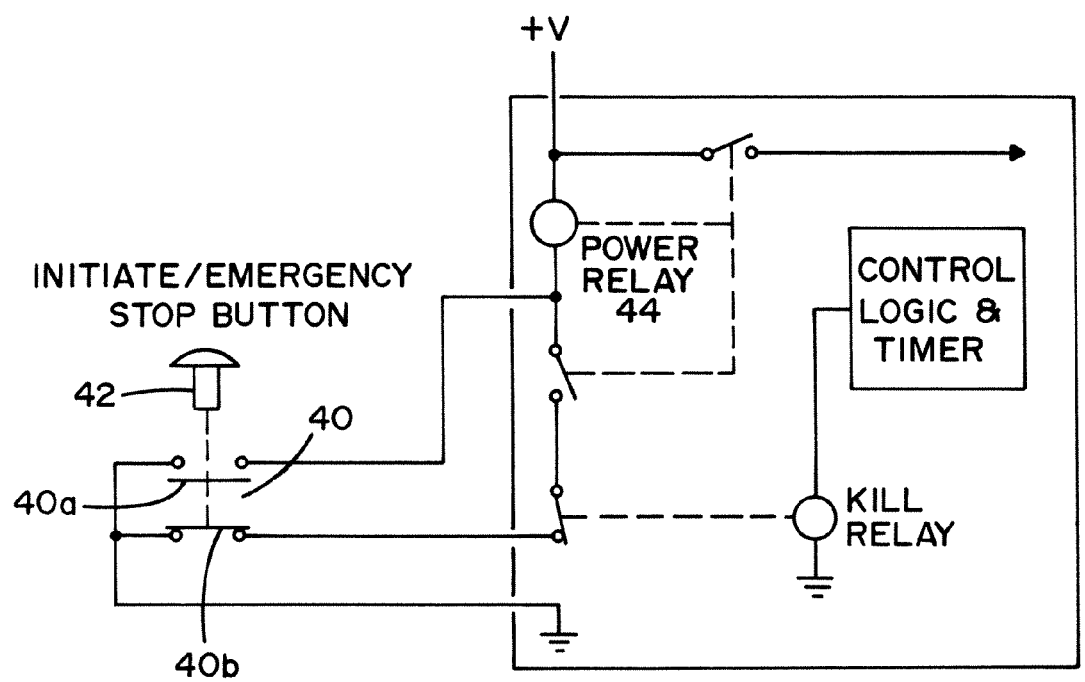
FIG. 6 is a flow diagram showing the initiate and emergency stop control system for the present invention.
Figure 7:
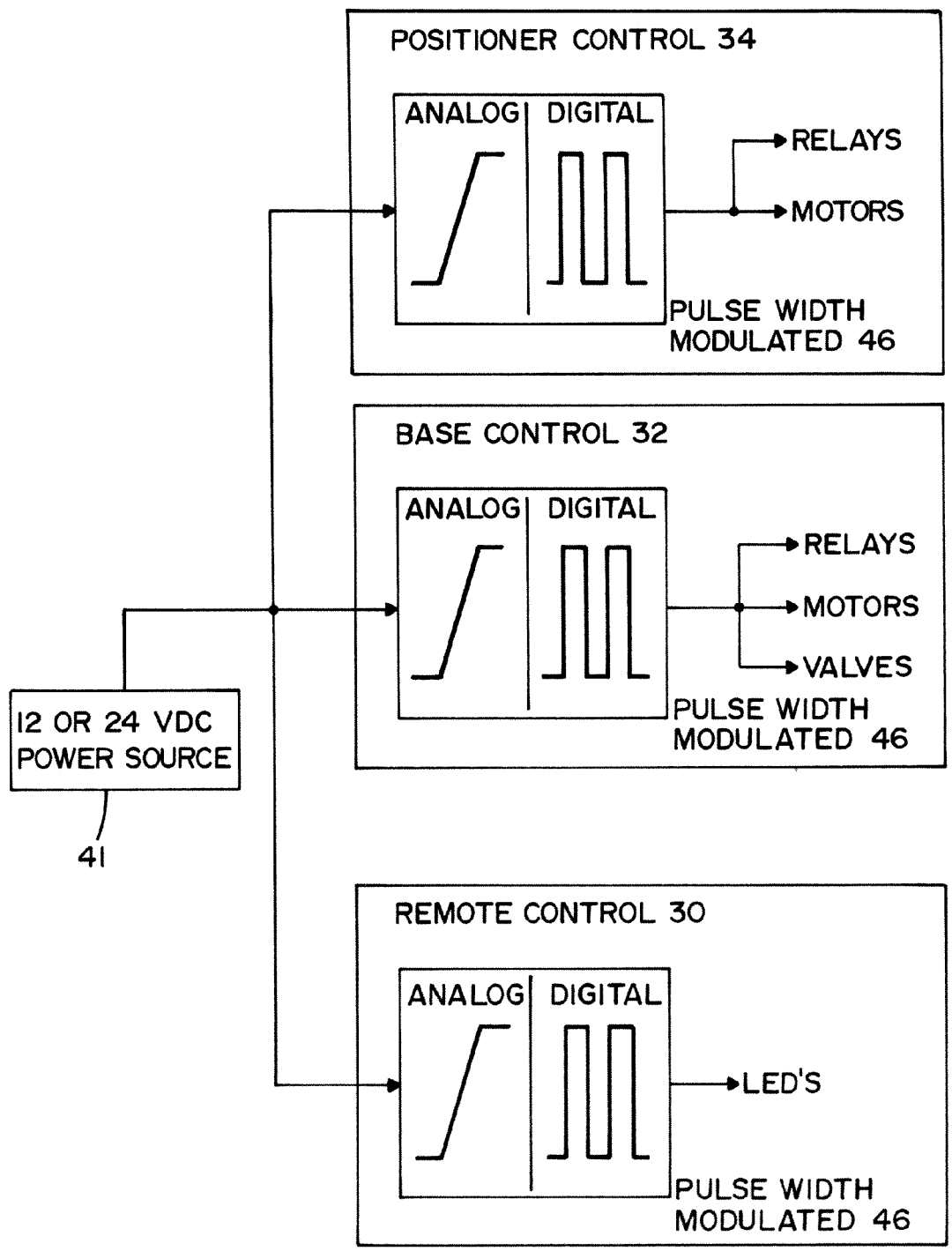
FIG. 7 is a flow diagram showing the positioner, base and remote control systems of the present invention; and, FIG. 8A-8C shows the air and vent valves of the present invention.

Referring now to FIG. 4, control of the mast positioner and lighting system includes a hand-held remote control 30, a base control 32 and a remote control positioner 34. The base control 32 utilizes a serial communications link 35 with other boards in the system to "multiplex" control data. The serial link can preferably include an RS-485 multi-drop type with settable data-loss response (set by a rocker switch to either stop or stow). Communication with the remote hand-held control can also be via a serial link 37 such as an RS-485 type link. Referring to FIGS. 6 and 7, a relay system 44 allows a 12 or 24 volt source 41 to be used to power the mast and light source. Pulse width modulators 46 adjust the output to always be 12 volts. Each system component monitors supply voltage and "chops" the voltage going to high current devices such as motors, relays, and valves allowing the unit to run from either 12 or 24 volts DC power. The output for the light source, used as a look out light to illuminate the area that the mast is being raised into, will be "chopped" to allow use of a 12 volt light bulb in all conditions.

Switching of AC power to the lights 22 occurs via the positioner control 34. No AC power is connected to the base control board 32. AC power preferably enters the system via an environmentally sealed military connector (such as MS 3102 R24-10P) attached internally by way of a terminal strip to AC power wires of custom coiled cable imbedded within the mast. Pairs of 14 gage wires supply AC power to each of the two banks of lights 22 and also serve as a chassis ground. Another pair of 18 gage wires supply DC power for operation of the positioner control 34. These two wires will connect to the base control board. Finally, a pair of 20 gage wires will supply the communications line to the positioner control and will also connect to the base control board.

Figure 5:
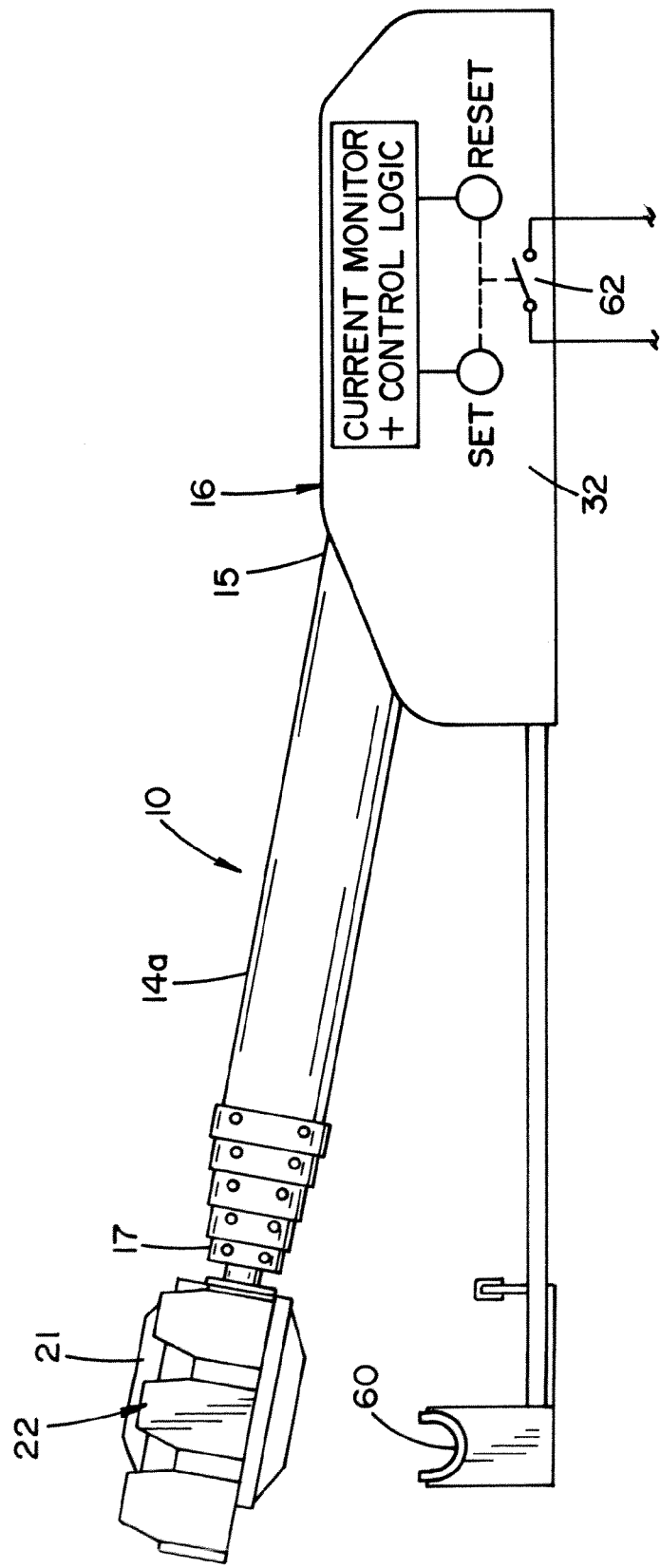
FIG. 5 is a side elevational view of the mast illustrating the current monitor and control logic.

The DC power and external control lines enter the system via a connector mounted directly on the base control board. The interlock circuitry used is threefold. Referring now to FIG. 5, a "mast inactive" contact closure 62 output will be provided as part of the base control 32 as an indication when closed that the mast is fully stowed, has shut itself down, and is ready for transport. Secondly, referring to FIG. 6, a "safety loop" input 40b for a contact closure 40 will be provided. All mast functions will come to an immediate stop as soon as that circuit senses an open contact. The system will draw absolutely no current in the absence of the contact closure. Third, an "initiate" input 40a will be provided. Before the mast can be raised, this input must be momentarily closed. The operator will then have a predetermined time to use the hand-held remote control 30 to raise the mast. If he fails to do so within that time frame, the mast will completely shut itself down and will require another "initiate" closure 40a for another attempt. Once the mast has been raised any amount, the "mast inactive" contact 62 will open. At that point, the timeout function is no longer in effect and normal operation takes over. Once the mast has been returned to the nested position, the mast will disconnect itself from power and the "mast inactive" contact will close. However, if the "initiate" input is hot-wired or for some other reason held closed so that the mast cannot disconnect itself from power, after a predetermined time the "mast inactive" output 62 will flash "on" and "off" to indicate this condition and will remain flashing until the problem is corrected. Additionally, an "Initiate Pushbutton" message display can be presented on the hand-held remote control.

The "Initiate" and "Safety Loop" inputs can be appropriately driven with an industrial Push/Pull button 42 such as shown in FIG. 6. The initiate button 42 is pulled to power the mast unit or engage the "initiate" input 40a. If the unit is not moved from the stowed position within a predetermined time, the unit times out and disconnects from power. The button 42 is pushed for an emergency stop and disconnects the unit from power. An immediate power disconnect occurs and the mast vents all air.

The base control board 32 can be set for either "night scan" or "night scan chief" operation by a computer connected to the serial link 35. This affects when the positioner control is placed in the stow mode, and whether or not the base control waits for it before lowering the mast.

Referring now to FIG. 5, the base control 32 will monitor current to the actuator motor and determine that the mast is nested or in a stowed position in cradle 60 when that current continually increases for a predetermined time. Additionally, the control will monitor motor current to see if there is a sudden drop in current during nesting (indicating the inclination's motor has exceeded its internal limit switches). A limit switch indicating the mast has been fully extended or retracted could use a magnetic sensing switch, such as a reed switch. The sensing switch can indicate that the mast is at the 90° position. Current increase over the sampling period triggers power down at stow. An integrated saddle or cradle 60 reduces the required skill of the customer for installation by eliminating adjustments required for installation.

Contact closure to customer interlock circuitry is shown in FIG. 5. A bistable relay 62 maintains the correct state regardless of the unit being powered. The relay remains in an open state when the unit is not stowed. When the unit is stowed, the relay latches to a closed state. The relay serves to provide a mode for transmission or other interlock to prevent vehicle movement when the mast is not in a stowed position.

If at a "power on" position the base control determines the mast is not in its nested position and one or both communication links 35, 37 are not functioning, it will attempt to re-establish communications for a pre-defined time. If communication with the positioner control is established but communication with the hand-held remote cannot be established, then the base control will request the positioner control to stow and then nest the mast.

Figure 8A:
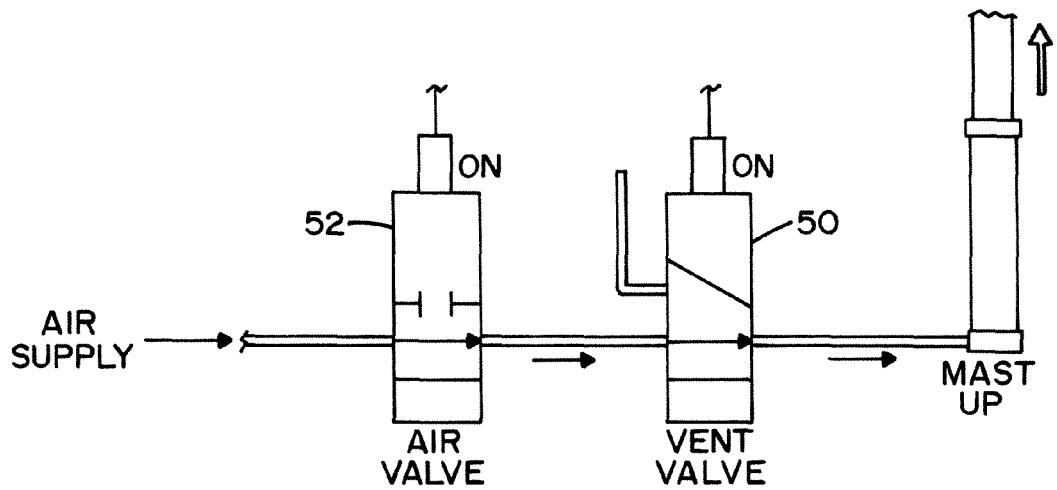
Figure 8B:
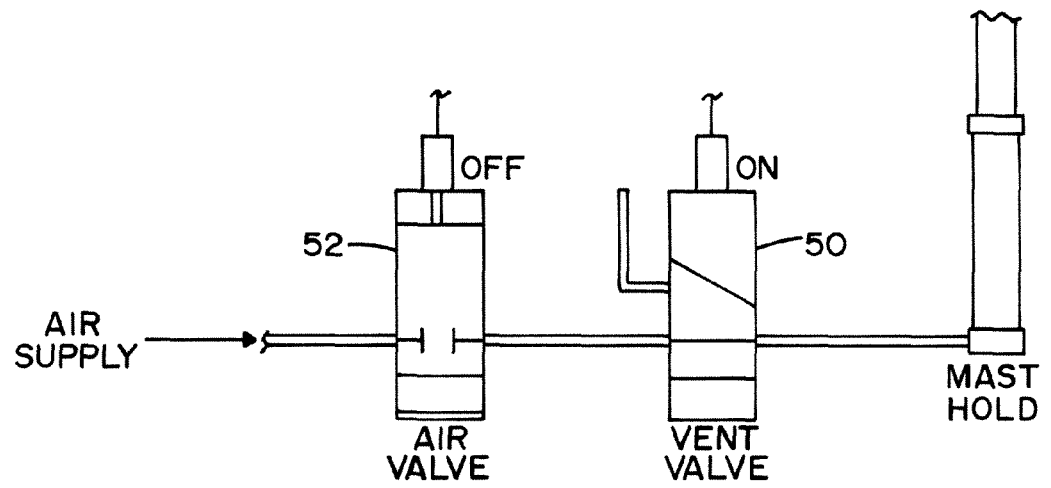
Figure 8C:
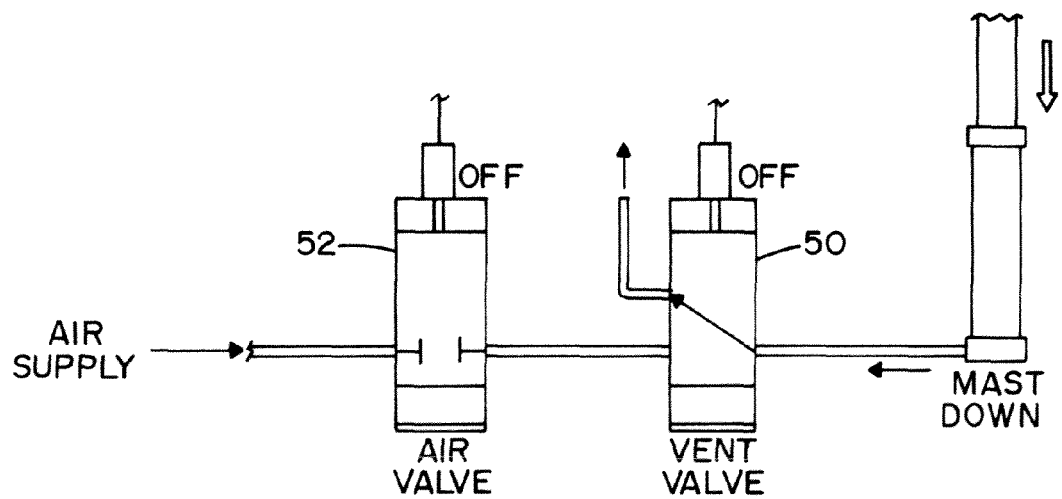

Referring now to FIGS. 8a, 8b, and 8c, the output for an "Up" air valve 52 is sufficient to drive an on-board air compressor for raising or lowering the mast. The control will have an automatic resetting circuit breaker for overload protection. If it trips, the control has to be re-initiated. In the preferred embodiment, a three-way valve functioning as a normally open vent valve 50 and a three-way valve functioning as a normally closed air valve 52 are used. Energization of both valves 50, 52 raises the mast, energization of only the vent valve maintains the mast position, and the de-energization of both valves lowers the mast. In the event of a power failure, air is exhausted from the mast tube sections resulting in the tubes retracting to a lowered vertical position.

An operator can initiate an unattended lowering and stowing of the mast. This is accomplished by two rapid sequential activations of a "Down" button on the remote control 30 within a short period of time such as a half-second. This automatic unattended sequence can be terminated at any time by a single activation of an "Up" button on the remote control 30.

The hand-held remote control 30 overcomes several deficiencies in the prior art remote control designs. Those deficiencies are as follows: 1) toggle switches used with the prior designs are vulnerable to breakage; 2) a large quantity of wires in the cable; and, 3) an absence of a fault indicator.

The hand-held remote control 30 of the present invention utilizes a serial communications link 37 to link to the base control to "multiplex" control data. A two wire serial communications link 37 minimizes wiring for multiple functions. The remote control can also be protected against reverse voltage hook-up. A connector for connecting the mast unit to a computer can be a bayonet environmentally sealed military connector such as an MS3106E14S-2P style connector. The cable used with the remote control can be of retractable four conductor weather proof construction.

Figure 3:
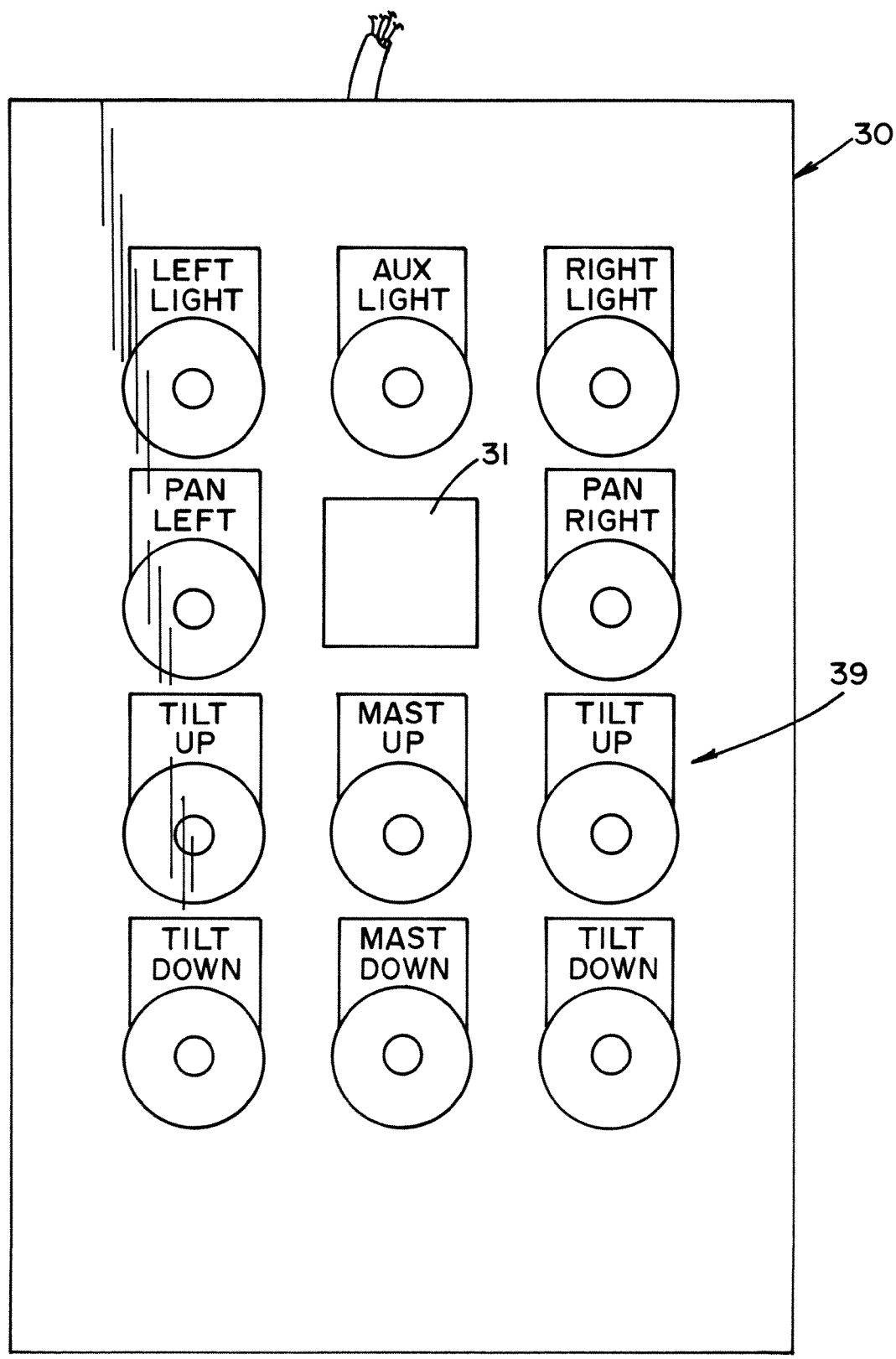
FIG. 3 is a plan view of the remote control device for the mast of FIG. 1.

The toggle switches of previous remote controls is replaced by an eleven position keypad 39 (see FIG. 3). An LED message display illuminates at appropriate times to indicate when functions are active and can display fault codes.

The hand-held remote control 30 accepts switch activations from the operator and translates them into serial commands for transmission to the base control board 32 via the serial link 37. The hand-held remote control will send, at the request of the base control board, a status message to inform the base control which switches are engaged and that it is still functioning properly. If the base control does not receive a response, for whatever reason, the base control will take appropriate action. If the hand-held remote control fails to receive a request from the base control board within a specified time period, it will light an LED display with a predefined indication of a fault. If the operator engages a switch, the hand-held remote control will appropriately modify the status response repeatedly as long as the operator continues to engage that switch. The base control will pass along appropriate serial commands to the positioner control in response to the hand-held remote control. The positioner control will also send status responses upon request to the base control board to let it know it is functioning properly. If an error status message is received or no message is received from the positioner control, the base control board will pass that information on to the hand-held remote control for interpretation for the fault display. Additionally, various states of the system will be passed to the hand-held remote control so that status LEDs can give proper indication of the state of the system.

Referring now to FIG. 3, switches available to the operator on the hand-held remote 30 are as follows: Pan Left, Pan Right, Left Lights (toggles on and off), Auxiliary Lights (toggles on and off), Right Lights (toggles on and off), Left Tilt Up, Mast Up, Right Tilt Up, Left Tilt Down, Mast Down, and Right Tilt Down. These switches correspond to powering the lights and movement of the mast.

The fault codes are indicated by an LED message display 31 (see FIG. 3). The messages take the form of Err U,NN where U is the specific board (or unit number), and NN is the specific fault. These messages are presented until the system is powered down.

The base control board 32 is given the designation of unit number one. The following fault messages would be included: Err 1,07—communication timeout, Err 1,08—communication fault, Err 1,09—initiate pushbutton Err 1,10—EEPROM life, and Err 1,11—saddle location.

The positioner control 34 is given the designation of unit number two. The following fault messages would be included: Err 2,01—pan limit overlap, Err 2,02—left tilt limit stuck, Err 2,03—right tilt limit stuck, Err 2,04—pan limit stuck, Err 2,07—communication timeout, Err 2,08—communication fault, Err 2,09—left tilt up limit, Err 2,10—left tilt down limit, Err 2,11—right tilt up limit, Err 2,12—right tilt down limit, Err 2,13—pan right limit, Err 2,14—pan left limit, Err 2,15—left tilt limit overlap, and Err 2,16—right tilt limit overlap.

The hand-held remote board 30 is given the designation of unit number one. The following fault messages would be included: Err 3,07—communication timeout, Err 3,08—communication fault, and Err 3,09—internal communication fault.

An LED display message of Err 2,07 would indicate that the base board has not received a response from he positioner control within the maximum allotted time.

The positioner control 34 utilizes a serial communications link 35 with the base control to "multiplex" control data. The two wire serial link can be an RS-485 multi-drop link with settable data-loss response (set by rocker switch to either stop or stow). The link minimizes the need for additional wiring for multiple functions. The multi-drop capability would allow later addition of other intelligent devices to the remote control positioner such as a wireless link. A relay such as a hybrid MOSFET/Relay permits 12 volt or 24 volt operation. Switching of the AC power to the lights will be implemented in the positioner control. A relay breaking both sides of the AC power and supporting up to 20 amps load per side will be used. Since a strobe (auxiliary) light obtains its power from limited control power lines, only a customer supplied/installed full-voltage device such as a strobe can be supported. The positioner control board can be protected against reverse voltage hook-up.

Sensing of the pan and tilt motors limits is accomplished via photo-interrupters. These feed into analog inputs on a microcontroller to monitor potential contamination. These photo-interrupters will mount directly on the positioner control board and will be interrupted by opaque flags attached to the motor shafts. Various fault codes can be passed on to the base control board for appropriate handling. If desired, the base control board can be conformal coated.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A control system for a vehicle mounted pneumatically operated mast, comprising:
   a first control comprising a plurality of switches for powering lights and moving said mast and an LED digital message display which indicates a plurality of fault codes related to powering lights and moving said mast wherein said message display comprises at least the following fault codes: Err U, N wherein Err is for error, U is for a specific band number and N is for a specific fault; wherein U is given a specific value of one, two or three for said first control, a second control and a positioning member;

wherein a first serial link communicates said first control with said second control, wherein said first serial link comprises an RS-485 link, and a second serial link communicates said second control with said positioning member;
a relay system communicating with said first and second control and said positioning member, wherein said relay system comprises:
a first input connected to a 12 volt source;
a second input connected to a 24 volt source;
an output connected to the first and second control and said positioning member; and
a relay to select between the 12 volt source and the 24 volt source and to selectively outputs one of the voltages;
a pulse width modulator communicating with said relay system to adjust the outputted power to 12 volts; and,
a contact closure provided to indicate when the mast is in a fully stowed position, said contact closure communicates with said second control.

2. The control system of claim 1, wherein said second serial link comprises a RS-485 link.

3. The control system of claim 1, further comprising a pulse width modulator communicating with said relay system to adjust voltage output to be 12 volts.

4. The control system of claim 1, wherein said positioning member provides AC power to an associated light system of said mast.

5. The control system of claim 1, wherein said second control provides DC power to said positioning member.

6. The control system of claim 1, further comprising an input system in communication with said second control for initiating and disengaging power to said mast.

7. The control system of claim 6, wherein said input system comprises a first input that initiates power to said mast when said first input is placed in a closed position.

8. The control system of claim 7, wherein said input system further comprises a second input that disconnects power from said mast when said second input is placed in a opened position.

9. The control system of claim 8, further comprising an actuator communicating with said first input and said second input to activate one of said first input and said second input.

10. The control system of claim 9, wherein said actuator is moved to a first position to activate said first input.

11. The control system of claim 9, wherein said actuator is moved to a second position to activate said second input.

12. The control system of claim 7, wherein said first input is momentarily closed prior to raising said mast via said first control.

13. The control system of claim 1 wherein said contact closure is opened by raising the mast from its stowed position.

14. The control system of claim 1, further comprising a pair of valves, wherein a first valve acts as an air valve and a second valve acts as a vent valve, wherein said valves are in communication with an air supply connected to said mast assembly.

15. The control system of claim 14, wherein energization of said first and second valves raises said mast to an elevated position.

16. The control system of claim 14, wherein energization of said vent valve maintains a position of said mast.

17. The control system of claim 14, wherein de-energization of said air valve and said vent valve lowers said mast to a stowed position.

18. The control system of claim 14, wherein said first valve is a three-way valve.

19. The control system of claim 14, wherein said second valve is a three way valve.

20. The control system of claim 1 wherein said first control comprises a hand-held remote control.

21. The control system of claim 20, wherein said first control comprises a keypad comprising said switches, wherein said switches comprise at least the following: Pan Left, Pan Right, Left Lights, Auxiliary Lights, Right Lights.

22. The control system of claim 1, wherein said second control is positioned on a base of said associated mast.

23. The control system of claim 1, wherein said positioning member is positioned adjacent a top end of said mast.

24. The control system of claim 1, wherein said second serial link comprises a pair of wires.

25. The control system of claim 1, wherein said 12 voltage source is a vehicle power supply and said 24 voltage source is a self-contained power supply separate from the vehicle power supply.

* * * * *